Patented Feb. 13, 1951

2,541,642

UNITED STATES PATENT OFFICE 2,541,642

COATING COMPOSITIONS CONTAINING GAMMA-FERRIC OXIDE HYDRATE

Charles D. Downs, Newtown, Pa., and John Martin, Trenton, N. J., assignors to Columbian Carbon Company, New York, N. Y., a corporation of Delaware No Drawing. Application November 8, 1947, Serial No. 784,934

7 Claims. (Cl. 260—37)

This invention relates to so-called "baked finishes," i. e., coating compositions consisting of a pigment and a vehicle which, after application to the surface to be protected, are subjected to relatively high temperatures to afford a tough protecting film on the surface.

The use of hydrated ferric oxide as a pigment with drying oils in the absence of resins has been suggested. The hydrated ferric oxide of commerce is of the alpha variety. It is yellow in color, and when a film consisting of such pigment and drying oils is heated to a temperature of 500° to 690° F., the oxide is dehydrated and the coating becomes a streaky, non-uniform red in color. Such coatings are not satisfactory because of the failure to produce a uniform pleasing appearance of the surface treated therewith.

It is the object of the present invention to provide a novel coating composition which is free from defects which are inherent in the compositions heretofore known.

Another object of the invention is the provision of a coating composition which, when subjected to heating in the form of a film, will produce a tough, resilient coating of uniform and pleasing appearance.

Other objects and advantages of the invention will be apparent as it is better understood by reference to the following specification, in which the preferred embodiments are described.

The invention depends upon the use of gamma-ferric oxide hydrate, a material which is distinguished from alpha-ferric oxide hydrate of commerce by its X-ray diffraction pattern. It corresponds to the product prepared by the method of Baudisch and Albrecht, Jour. Am. Chem. Soc., 54, 943, 1932. This material has not been available heretofore in commercial quantities. However, in the applications of John Martin, Ser. No. 760,496 and 760,497, each filed July 11, 1947, methods of producing gamma-ferric oxide and gamma-ferric oxide hydrate which are adapted to quantity production of the product are described.

We have discovered that gamma-ferric oxide hydrate is particularly adapted for use in coating compositions employed in baked finishes. The orange-yellow color of the pigment, upon heating in the presence of resins or oils to temperatures as low as 300° F. and up to 527° F. or higher, is converted to a pleasing, uniform brown. Furthermore, the gamma-ferric oxide hydrate may be compounded with resins as well as oils to produce tougher and more resistant films than those in which alpha iron compounds are used.

Among the most desirable resins suitable for compounding with gamma-ferric oxide hydrate are the silicone resins, for example, those described by Rochow in "Chemistry of the Silicones," John Wiley & Sons, Inc., New York, 1946, pages 70–77. These and other silicone resins are the basis of silicone varnishes which are commercially available (marketed by Dow Corning Corporation). Silicone varnishes are ideal vehicles for gamma-ferric oxide hydrate and produce, when heated to temperatures above 300° F., excellent tough and resilient films of uniform and otherwise satisfactory brown color.

The invention is not, however, limited to the use of silicone varnishes as vehicles, since varnishes made from phenolic, alkyd and urea-formaldehyde resins may be similarly used. The gamma-ferric oxide hydrate can be compounded also with drying oils, for example linseed oil, soy bean oil, cottonseed oil, perilla oil, oiticica oil, China wood oil, fish oil and products derived from such oils. Such drying oils may be employed, together with resin varnishes, in any desired proportions to produce suitable coating compositions. The particular nature of the vehicle is relatively unimportant, so long as it has the ability to withstand decomposition at the temperatures to which the film is subjected. Any of the materials specified and mixtures thereof are stable at temperatures of 300° F. and even at higher temperatures up to about 527° F. Suitable dryers such as cobalt naphthenate may be added to facilitate the drying of the films. Such additions are not, however, essential, since satisfactory coatings can be obtained without dryers.

Potassium or sodium silicate is also suitable for use as a vehicle with gamma-ferric oxide hydrate to produce coating compositions of the type herein described.

The compositions may be prepared in any desirable proportions. The proportions will vary, depending upon the nature of the vehicle and the desired viscosity or flowing characteristic of the completed composition. It is usually desirable to mix about 100 pounds of gamma-ferric oxide hydrate with approximately 150 pounds of the selected varnish or oil. This serves as a mill base which is ground upon a roller mill until uniformity is obtained. The mill base may then be diluted or reduced by adding 150 pounds or more of the selected varnish or oil to about 150 pounds of the mill base. If a thinner composition is desired, additional varnish or oil may be introduced until the desired result is obtained. The composition is then applied to the surface to be treated and subjected in a suitable oven to a temperature of between 300° and 527° F. for approximately four hours. During this period, the original color of the composition, which was orange-yellow, is converted to a pleasing, uniform brown. It has none of the streaky reddish characteristic of similar compositions made from alpha-ferric oxide hydrate.

It is to be understood that the proportions as above stated are merely illustrative and that any suitable additions such as dryers or thinners may be employed to give the composition the desired flowing characteristic.

In addition to its usefulness as a coating for iron and steel and other metals, the composition is particularly useful in the preparation of roofing granules such as are applied to flexible roofing material. In preparing such material, grains of silica are coated with the composition and heated within the temperature range mentioned, so that each granule is covered with a tough coating of the composition. Granules so coated will outwear in service any similar materials heretofore available.

Various changes may be made in the details of the composition and the procedure as described without departing from the invention or sacrificing any of the advantages thereof.

We claim:

1. A coating composition adapted for the production of baked finishes consisting of gamma-ferric oxide hydrate and a vehicle therefor.

2. A coating composition adapted for the production of baked finishes consisting of gamma-ferric oxide hydrate and a vehicle therefor consisting of a varnish containing a synthetic resin.

3. A coating composition adapted for the production of baked finishes consisting of gamma-ferric oxide hydrate and a vehicle therefor consisting of a drying oil.

4. A coating composition adapted for the production of baked finishes consisting of gamma-ferric oxide hydrate and a vehicle therefor consisting of a varnish containing a synthetic resin and a drying oil.

5. A coating composition adapted for the production of baked finishes consisting of gamma-ferric oxide hydrate and a vehicle therefor consisting of a varnish containing a silicone resin.

6. A coating composition adapted for the production of baked finishes consisting of gamma-ferric oxide hydrate and a vehicle therefor which is stable at temperatures of 300° F. and higher.

7. A coating composition adapted for the production of baked finishes consisting of gamma-ferric oxide hydrate and an organic vehicle therefor which is stable at temperatures of 300° F. and higher.

CHARLES D. DOWNS.
JOHN MARTIN.

REFERENCES CITED

The following references are of record in the file of this patent:

UNITED STATES PATENTS

| Number | Name | Date |
|---|---|---|
| 2,045,006 | Wiegand | June 23, 1936 |
| 2,258,220 | Rochow | Oct. 7, 1941 |
| 2,388,659 | Ryan et al. | Nov. 6, 1945 |

OTHER REFERENCES

Mattiello, "Protective and Decorative Coatings," vol. 2, pp. 292–293.

Chemical Reviews, vol. 15, p. 59.